United States Patent
Van Der Knaap et al.

(10) Patent No.: US 9,067,629 B2
(45) Date of Patent: Jun. 30, 2015

(54) MOUNTING ARRANGEMENT FOR A TRAILER COUPLING

(75) Inventors: Albertus Clemens Maria Van Der Knaap, Helmond (NL); Jasper Joshua Backx, Eindhoven (NL)

(73) Assignee: DAF Trucks N.V., Eindhoven (NL)

( * ) Notice: Subject to any disclaimer, the term of this patent is extended or adjusted under 35 U.S.C. 154(b) by 36 days.

(21) Appl. No.: 13/884,691

(22) PCT Filed: Oct. 4, 2011

(86) PCT No.: PCT/NL2011/050671
§ 371 (c)(1),
(2), (4) Date: Jul. 30, 2013

(87) PCT Pub. No.: WO2012/064183
PCT Pub. Date: May 18, 2012

(65) Prior Publication Data
US 2014/0035257 A1 Feb. 6, 2014

(30) Foreign Application Priority Data
Nov. 10, 2010 (NL) ...................................... 2005663

(51) Int. Cl.
*B62D 53/08* (2006.01)
*B62D 21/02* (2006.01)
(Continued)

(52) U.S. Cl.
CPC ...... *B62D 53/0807* (2013.01); *B60G 2206/601* (2013.01); *B60G 2300/044* (2013.01); *B62D 21/02* (2013.01); *B62D 49/005* (2013.01); *B62D 53/08* (2013.01); *F16F 15/08* (2013.01)

(58) Field of Classification Search
CPC ............................ B62D 53/08; B62D 53/0807
USPC .................................. 280/438.1, 433, 441.1
See application file for complete search history.

(56) References Cited

U.S. PATENT DOCUMENTS 2,799,516 A * 7/1957 Greenway ..................... 280/407
3,580,611 A   5/1971 McNitt
(Continued)

FOREIGN PATENT DOCUMENTS

DE     7225068 U     2/1973
EP      591726 A2    4/1994
(Continued)

OTHER PUBLICATIONS

International Preliminary Report on Patentability—PCT/NL2011/050671—Date of issuance: Jun. 18, 2013.
(Continued)

*Primary Examiner* — Kevin Hurley
*Assistant Examiner* — Michael Stabley
(74) *Attorney, Agent, or Firm* — Banner & Witcoff, Ltd.

(57) ABSTRACT

A mounting arrangement (1; 101; 201) for mounting a trailer coupling to a tractor vehicle with a chassis that has a pair of rearwardly extending opposite left and right frame side members (9, 11; 109, 111; 209, 211) that includes opposite left and right bearing blocks (5, 7; 105, 107; 205, 207). The opposite left and right bearing blocks (5, 7; 105, 107; 205, 207) each have a support surface and a pivot bearing for being fixed directly or indirectly to the chassis of the tractor vehicle. A coupling saddle plate (3; 103; 203) is pivotally mounted from the opposite pivot bearings of the left and right bearing blocks (5, 7; 105, 107; 205, 207), while a diagonal cross brace (35; 135; 235) is provided between at least one of the left and right bearing blocks and a respective one of the transversely opposite right or left frame side members (9, 11; 109, 111; 209, 211). The diagonal cross brace (35; 135; 235) comprises at least one diagonally extending leg (39, 41; 139, 141) that is adapted to extend laterally inwardly and diagonally downward from at least one of the left and right bearing blocks (5, 7; 105, 107; 205, 207).

25 Claims, 5 Drawing Sheets

(51) Int. Cl.
  *B62D 49/00* (2006.01)
  *F16F 15/08* (2006.01)

(56) References Cited

U.S. PATENT DOCUMENTS

| | | | |
|---|---|---|---|
| 3,600,005 A * | 8/1971 | Glaza | 280/433 |
| 5,529,329 A * | 6/1996 | McCoy | 280/438.1 |
| 5,707,070 A * | 1/1998 | Lindenman et al. | 280/438.1 |
| 6,685,210 B2 * | 2/2004 | Lindenman et al. | 280/441 |
| 7,140,633 B2 * | 11/2006 | Audo et al. | 280/438.1 |
| 7,198,282 B2 * | 4/2007 | Burchett | 280/433 |
| 7,516,974 B1 | 4/2009 | Mann et al. | |
| 7,584,982 B2 * | 9/2009 | Fisher | 280/438.1 |
| 7,753,390 B1 * | 7/2010 | Mann et al. | 280/438.1 |
| 8,162,347 B2 * | 4/2012 | Mann et al. | 280/441.1 |
| 2003/0047906 A1 | 3/2003 | Hicks et al. | |
| 2003/0047907 A1 * | 3/2003 | Hicks et al. | 280/438.1 |
| 2005/0167944 A1 | 8/2005 | Audo et al. | |
| 2014/0138933 A1 * | 5/2014 | Diller | 280/433 |

FOREIGN PATENT DOCUMENTS

| | | |
|---|---|---|
| EP | 694467 A2 | 1/1996 |
| EP | 963902 A1 | 12/1999 |
| EP | 995664 A1 | 4/2000 |
| WO | 0134454 A1 | 5/2001 |

OTHER PUBLICATIONS

International Search Report—PCT/NL2011/050671—Mailing date: May 13, 2013.

* cited by examiner

MOUNTING ARRANGEMENT FOR A TRAILER COUPLING

CROSS REFERENCE TO RELATED APPLICATIONS

This application U.S. National Stage application under 35 U.S.C. §371 of International Application PCT/NL2011/050671 (published as WO 2012/064183 A1), filed Oct. 4, 2011, which claims priority to Application NL 2005663, Filed Nov. 10, 2010. Benefit of the filing date of each of these prior applications is hereby claimed. Each of these prior applications is hereby incorporated by reference in its entirety.

The invention relates to a mounting arrangement for a trailer coupling and more in particular to a kit of parts enabling mounting of a trailer coupling to a pair of parallel, opposite left and right frame side members of a tractor vehicle chassis. The invention also relates to a tractor vehicle provided with a trailer coupling and the parts enabling the mounting arrangement.

Trailer couplings mounted on tractor vehicles for towing semi-trailers are widely used in road transport of goods and are as old as the industry as exemplified by patent document U.S. Pat. No. 1,958,723. As disclosed in this prior art patent document such trailer couplings have a so-called 'fifth wheel' or saddle that is mounted for pivotal movement about a horizontal axis transverse to the parallel frame side members. This pivotal movement is about a rotation axis defined by two opposite pivot bearings provided integrally on left and right bearing blocks. The pivotal movement is necessary to allow a semi-trailer to allow the movements dictated by humps and hollows in road surfaces. With heavy goods vehicles it can be easily imagined that lateral forces, under dynamic conditions, which are to be absorbed by the tractor vehicle frame members via various mounting elements can be quite important. It has hitherto been a common feature to mount the opposite left and right bearing blocks on a bed or platform in the form of a reinforced mounting plate that is separately attached to the opposite left and right frame members of the tractor vehicle. It goes without saying that such a compilation of a multitude of mounting elements is cumbersome in assembly and may be associated with a weight penalty. It is therefore not surprising that there have been various proposals to eliminate the mounting plate by direct mounting of the bearing blocks to the opposite frame members or longerons. The patent documents CA 1159350 and EP 0694467 can generally serve as reference in this respect. With the arrangement proposed by CA 1159350 it has been very difficult, if not impossible, to prevent torsional deformation of the opposite frame members under heavy lateral loads. Relief to this phenomenon was only available by reverting to increasing the structural integrity and weight of the individual components and by limiting as far as possible the height of the fifth wheel above the vehicle frame. The latter option, in particular, is not always practical as it limits the use of the tractor vehicle to only those semi-trailers that offer a corresponding ride height. Another solution proposed by EP 0694467 uses a transverse connecting bar between the left and right bearing blocks. While this traverse connecting bar helps to distribute lateral forces over both opposite frame members, its function is merely comparable to the mounting plate, which it replaces. To sufficiently eliminate torsional flexing of the vehicle frame or chassis as a whole, the traverse connecting bar needs to be of unduly heavy construction, unless a chassis traverse of the tractor vehicle happens to be in the direct vicinity. It may be clear that the position of chassis traverse members is determined by the manufacturer of tractor vehicles and is outside of the control of manufacturers of trailer couplings that supply these accessories to different manufacturers of tractor vehicles. Moreover there is a wide variety of fore and aft positioning of the fifth wheel in accordance with particular preferences of the end users of such trailer couplings.

Another feature of the semi-trailer coupling arrangement described in EP 0694467 is an embodiment in which the bearing blocks are each designed to be fastened directly to an outside of a vertical web portion of the relevant adjacent frame side member. This requires an adaptation of the lower fastening portion of the left and right bearing blocks, but eliminates a need for drilling in the horizontal flanges of the frame side members or a need for additional side profiles. Although EP 0694467 thus recognises the advantages of retaining the integrity of the upper horizontal flanges of the chassis members, as well as the general need to reduce the number of mounting elements, its solution of a traverse connecting bar between its bearing blocks is still short of achieving optimal weight saving.

Accordingly it is an object of the present invention to propose a mounting arrangement for trailer couplings that has a more weight optimal and less complex construction, so that it contributes to increasing torsion stiffness of a tractor chassis in the direct vicinity of the trailer coupling. In a more general sense it is thus an object of the invention to overcome or ameliorate at least one of the disadvantages of the prior art. It is also an object of the present invention to provide alternative structures which are less cumbersome in assembly and operation and which moreover can be made relatively inexpensively. Alternatively it is an object of the invention to at least provide useful options to reduce the accumulated weight of those constructional elements that are associated in one way or another with the mounting of a trailer coupling to a tractor vehicle. Such would include constructional elements like coupling saddle, bearing blocks, chassis beams, chassis cross members, etc. In this regard the weight reduction is not necessarily simply reducing the weight of each individual part, but rather an optimization of material concentrations in those areas that are shared by more than one of the individual components where, in use, major forces occur. By having regard to the main directions of the applied forces it is also possible to avoid bending tensions. In conclusion an important objective of the invention is to minimise stress concentrations in the construction, contributing to weight saving of the assembly, and increasing durability.

To this end the invention provides a method of mounting a trailer coupling, a kit of parts for mounting a trailer coupling to a tractor vehicle and a tractor vehicle having a trailer coupling, as defined in any one of the appended claims. The disclosed arrangement includes opposite left and right bearing blocks that each have a support surface and a pivot bearing. A coupling saddle plate is pivotally mounted from the opposite pivot bearings of the left and right bearing blocks, while a diagonal cross brace is provided between at least one of the left and right bearing blocks and a respective one of the transversely opposite right or left frame side members. The diagonal cross brace preferably comprises at least one diagonally extending leg that is adapted to extend laterally inwardly and diagonally downward from at least one of the left and right bearing blocks. Such an arrangement enables a direct mounting of a trailer coupling to a tractor vehicle frame that reduces substantially the torsional deformation caused by lateral forces acting on the trailer coupling. Moreover the arrangement effectively reduces weight by allowing a reduced number of mounting elements also to be lighter, whereas the reduced number of mounting elements also simplifies assembly.

It is further advantageous, when the diagonal cross brace is combined with a chassis traverse that is also associated with the axle suspension of the tractor vehicle. In such an arrangement the diagonal bracing can be positioned directly between the pivot bearings for the coupling saddle and locations on the chassis traverse where reaction arms for the axle suspension are anchored.

Still further it may be advantageous to make use of triangular structures that distribute forces from a single apex point to three spread-apart corners of a triangle, in the fashion of a "tripod". The wider the spread-apart corners of the triangle can be spaced, the better any local stresses in the chassis of the tractor vehicle can be lowered.

Further advantageous aspects of the invention will become clear from the appended description of preferred embodiments, which will now be described in reference to the accompanying drawings, in which.

Figure 1:
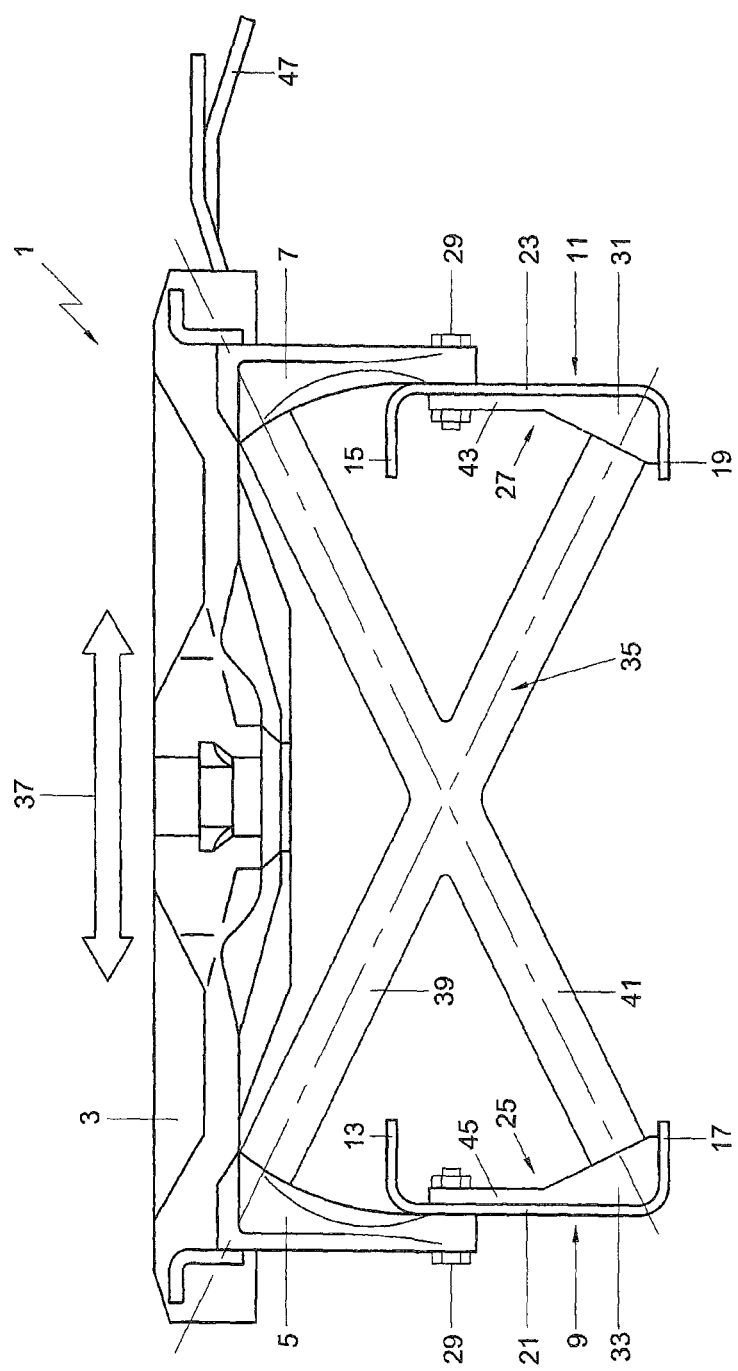
FIG. 1 is a rear elevation in the direction of forward travel of a tractor chassis frame with an installed fifth wheel semi-trailer coupling, according to a first embodiment of the invention.

A basic variation of the invention is illustrated in the rear elevation of FIG. 1. The mounting arrangement 1 of FIG. 1 includes a fifth wheel or saddle coupling plate 3. The coupling plate 3 is pivotally mounted from opposite left and right bearing blocks 5, 7 that each extend downwardly to meet left and right side frame members 9, 11. The opposite left and right side frame members 9, 11 are part of a tractor vehicle chassis and each have top and bottom flanges 13, 15, 17, 19 defining respective vertical web portions 21, 23. As is conventional in tractor vehicles, the opposite side frame members 9, 11 are substantially parallel in the direction of travel of the vehicle and are positioned with free ends of the top and bottom flanges 13, 15, 17, 19 facing one another. Accordingly, the left and right side frame members 9, 11 thereby each define a U-shape, cavities 25, 27 of which are facing each other. The downwardly extending sections of the left and right bearing blocks 5, 7 each are attached to an outside of the relevant vertical web portions 21, 23 of the left and right frame side members 9, 11 by means of bolts, indicated by reference numeral 29. Extending between at least one of the left and right bearing brackets 5, 7 and at least one right or left support base 31, 33 is a diagonal cross brace 35, which counteracts torsional deformation of the left and right frame side members 9, 11 under lateral forces acting on the trailer coupling saddle 3 in the directions of double headed arrow 37. For considerations of symmetry and weight distribution, it is preferred that the diagonal cross brace 35 is formed mirror symmetrical with a first leg 39 extending between the left bearing block 5 and the right support base 31 and a second leg 41 extending between the right bearing block 7 and the left support base 33. Preferably, also the right and left support bases 31, 33 are each provided with an upstanding leg 43, 45 that overlaps with the vertical mounting area of the respective left and right bearing blocks 5, 7 to be attached to the relevant vertical webs 21, 23 of the frame side members 9, 11 by the same fastening bolts 29. The trailer coupling saddle can further be provided with an unlocking handle 47, as is conventional.

Figure 2:
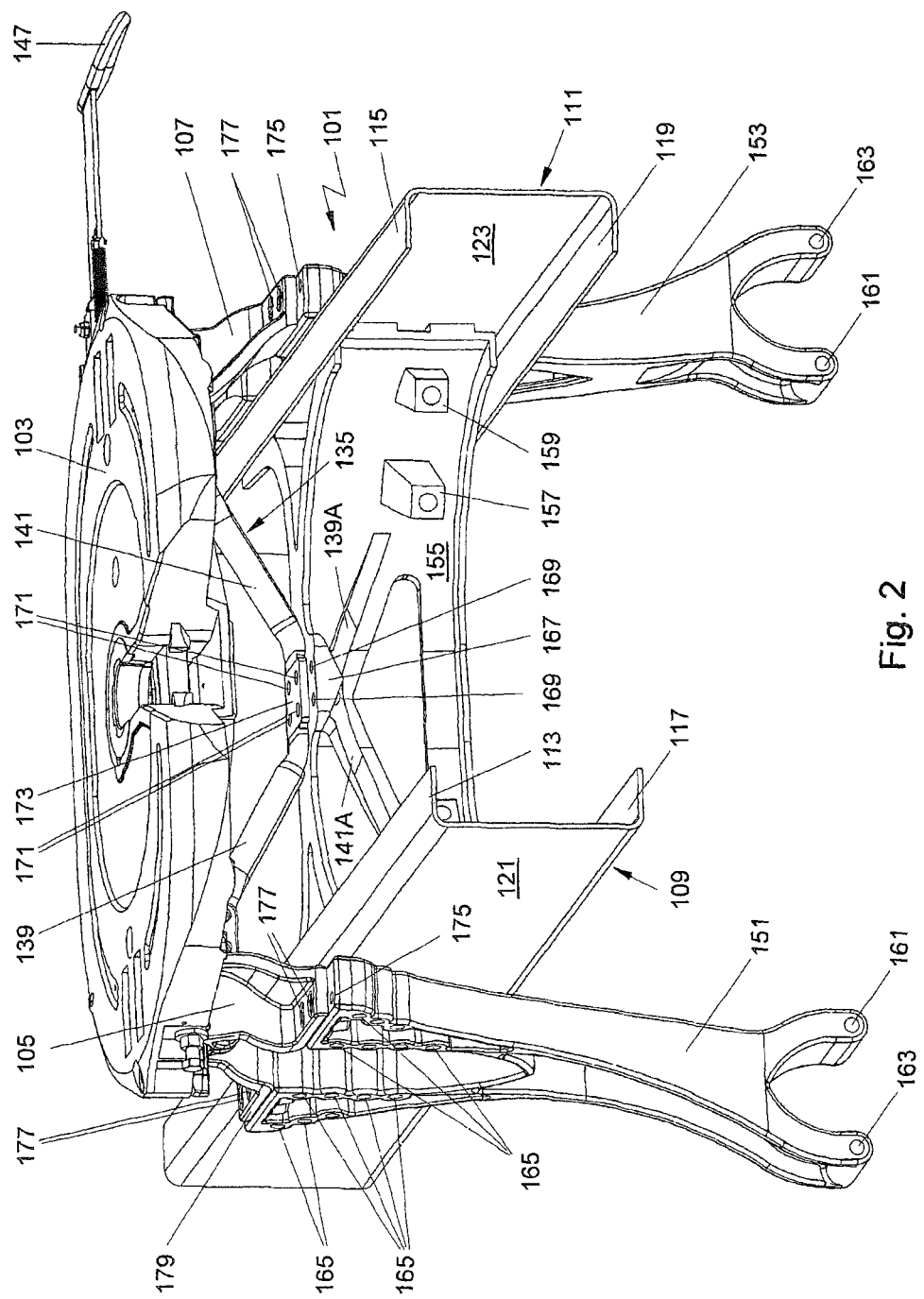
FIG. 2 is an isometric rear view in the direction of forward travel of a second embodiment of a trailer coupling mounting arrangement.
Figure 3:
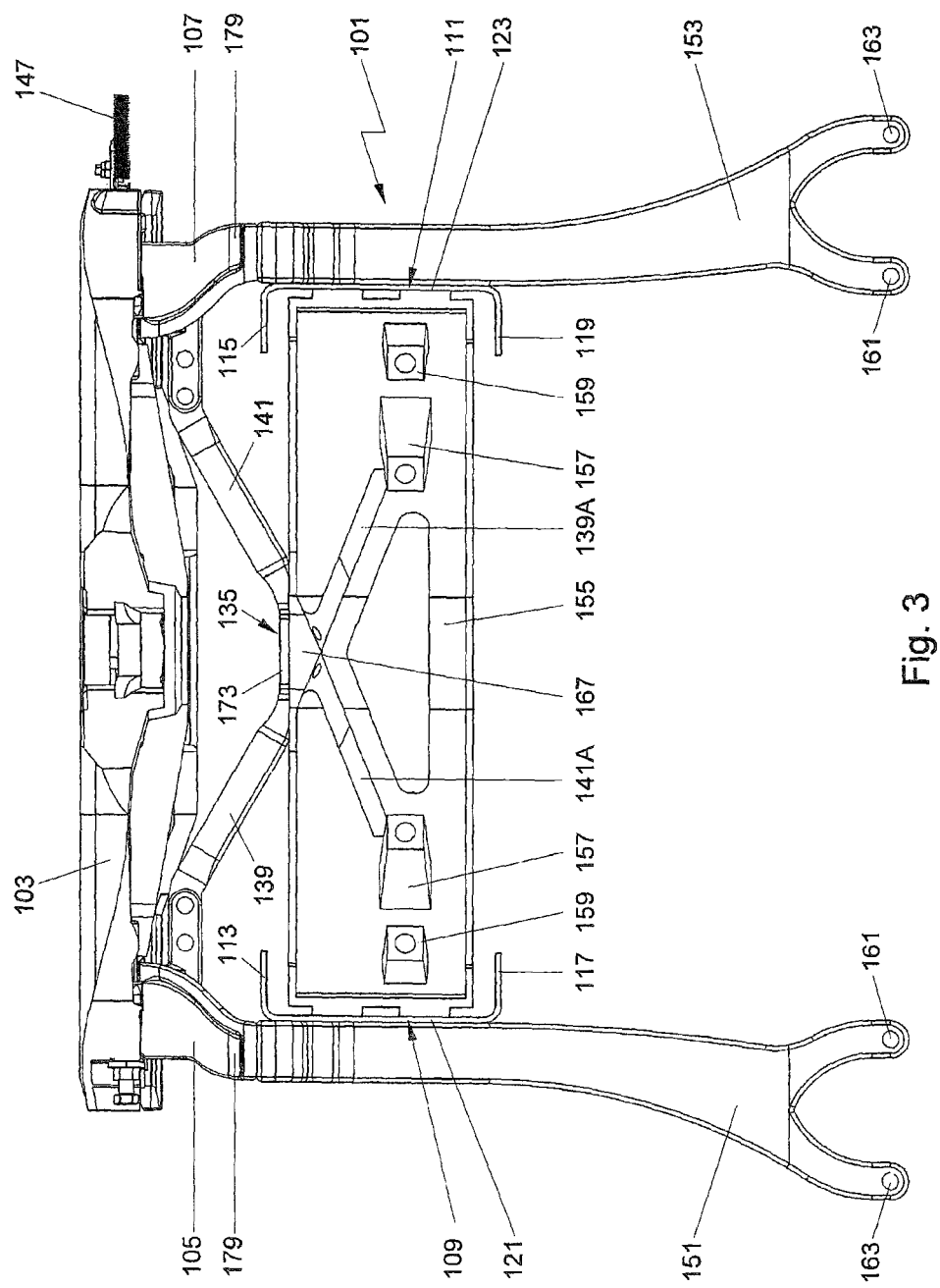
FIG. 3 is a rear elevation similar to FIG. 1, but showing the second embodiment.
Figure 4:
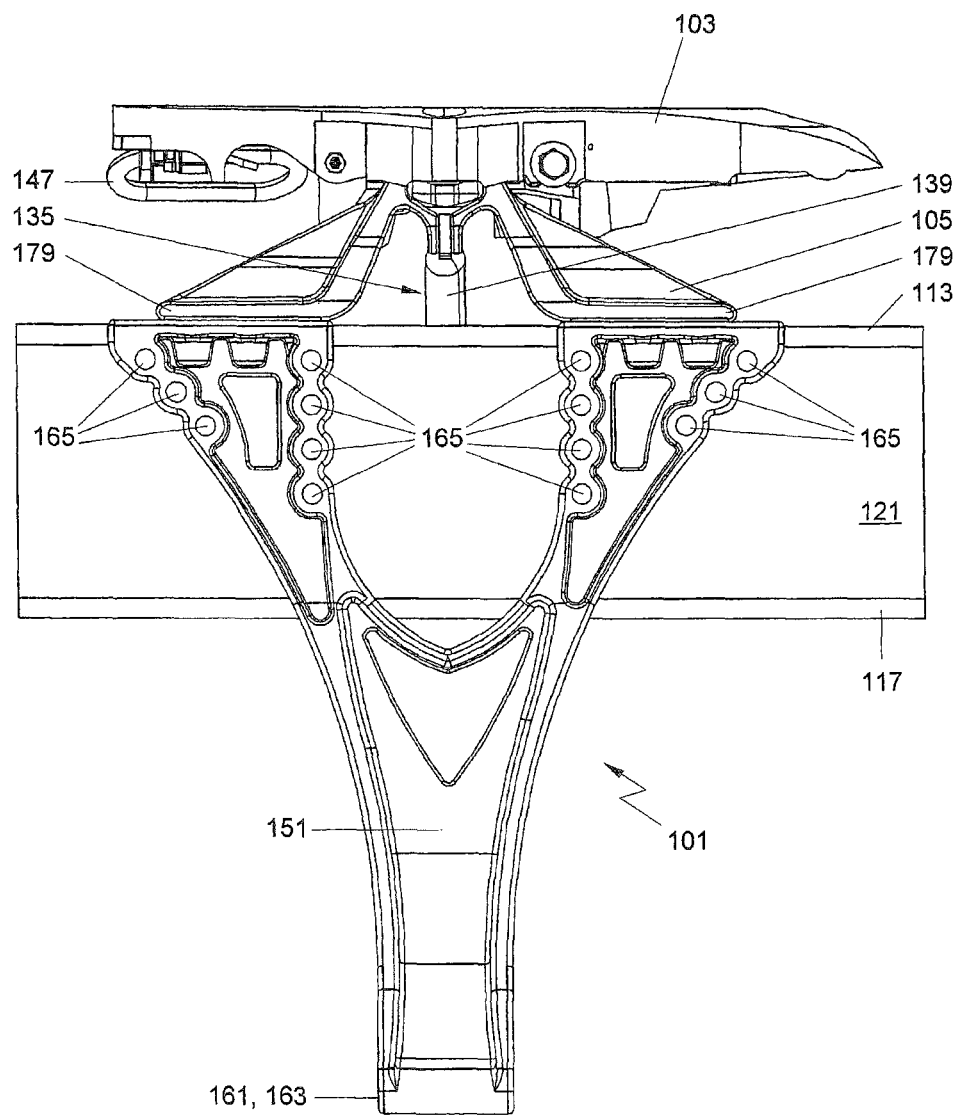
FIG. 4 is a side elevation of the second embodiment.

Having now explained the basis principle of the invention in relation to FIG. 1, one preferred embodiment will now be described in reference to FIGS. 2, 3 and 4. In reference to the embodiment of FIGS. 2, 3 and 4, similar elements are referred to by reference numerals that differ a full "100" from those used in FIG. 1. As seen in FIG. 2, a mounting arrangement 101 includes again a coupling saddle 103 that is pivotally supported by left and right bearing blocks 105, 107. The attachment of the left and right bearing blocks 105, 107 to the relevant left and right frame side member 109, 111 differs from that shown in FIG. 1, in that it is combined with left and right wheel suspension brackets 151, 153. The wheel suspension brackets 151, 153 are usually associated with a chassis traverse 155 that can be provided with inner and outer anchorage bosses 157, 159 for mounting of an upper reaction triangle of a wheel and axle suspension. The left and right suspension brackets 151, 153 are each provided with similar inner and outer anchorage provisions 161, 163 for receiving radius rods, or the like, as is conventional for tractor vehicles. The chassis traverse 155 is fixedly mounted between the inwardly facing vertical web portions 121, 123 of the opposite left and right frame side members 109, 111. As is usual in such constructions, the suspension brackets 151, 153 are provided with a plurality of mounting holes 165 for receiving mounting bolts or fasteners (not shown, but conventional). At least some of the mounting holes 165 of the suspension brackets 151, 153 correspond with mounting provisions on the chassis traverse 155 (again not indicated in FIGS. 2-4, but conventional). As viewed best in FIGS. 2 and 3, a modified form of diagonal cross brace 135 extends between the left and right bearing blocks 105, 107. The modified diagonal cross brace 135 has its function combined with the chassis traverse 155. It should be noticed that the diagonal cross brace 135 in this embodiment is constructed such that its form and location coincides with a path of force transmission that exists between a left coupling saddle pivot bearing (more or less hidden from view in FIGS. 2-4, but conventional) and a right anchorage point 157, 159 of an axle suspension reaction linkage, such as triangle. A similar force transmission path extends from the right coupling saddle pivot bearing to the left reaction triangle anchorage point. This minimises the likelihood of lateral forces introducing stress concentrations in the assembly. To this end the chassis traverse 155 has a mounting platform 167, with a plurality of mounting holes 169. The mounting holes 169 correspond partly with mounting holes 171 provided in a flattened centre section 173 of the diagonal cross brace 135 that is positioned between opposite first and second legs 139, 141 thereof. A similar plurality of partly corresponding mounting holes 175, 177 is provided in confronting upper horizontal surfaces of the suspension brackets 151, 153 and lower horizontal mounting flanges 179 of the bearing blocks 105, 107. As best seen in FIG. 2, an excess number of mounting holes 169, 175 in the upper horizontal surfaces of the mounting platform 167 and the suspension brackets 151, 153 respectively, will allow for an amount of selective for and aft adjustment of the trailer coupling saddle 103 in respect of the longitudinal direction of the tractor chassis. For clarity, fasteners and/or bolts that cooperate with the various mounting holes 165, 169, 171, 175, 177 have not been illustrated in FIGS. 2, 3 and 4, because these are conventional and well known to the skilled persons. It is further seen in FIGS. 2 and 3 that the mounting platform 167 is additionally supported on diagonal reinforcements 139A, 141A, integrally formed in the chassis traverse 155. Each of these reinforcements 139A, 141A act as an extension of the respective diagonal first and second legs 139, 141 and extend toward the region where the anchorage bosses 157, 159 support the upper reaction triangle and also close to the opposite frame side members 109, 111. From FIGS. 3 and 4 it can further be seen how use is made of triangular structures that distribute forces from a single apex point to spread-apart corners of a triangle, in the fashion of a "tripod". FIG. 4 in particular illustrates the wide triangular basis of the bearing block 105, with "tripod"-struts meeting the also bifurcated upper end of the suspension bracket 151. A further "tripod"-strut, extending from the coupling saddle pivot bearing is the diagonal leg 139 visible in FIG. 3. A further advantage of the bifurcated mounting sections of the suspension bracket 151, 153 and bearing block 105, 107 is that it provides more room for the manipulation of tools for attaching fasteners that mount the suspension brackets 151, 153 to the frame side members 109, 111 and the bearing blocks 105, 107 to the suspension brackets and/or to the frame side members 109, 111. Also in this embodiment with its chassis traverse 155 between the opposite left and right frame side members 109, 111, the inward ends of the first and second diagonal legs 139, 141 are conveniently joined to one another by a flattened centre section that is adapted to be affixed to a horizontal top surface of a chassis traverse 155. In particular it is convenient when the inwardly and downwardly extending legs 139, 141 of the diagonal cross brace 135 are formed from hollow tubular material, which can quite easily be flattened and bend in the middle.

Figure 5:
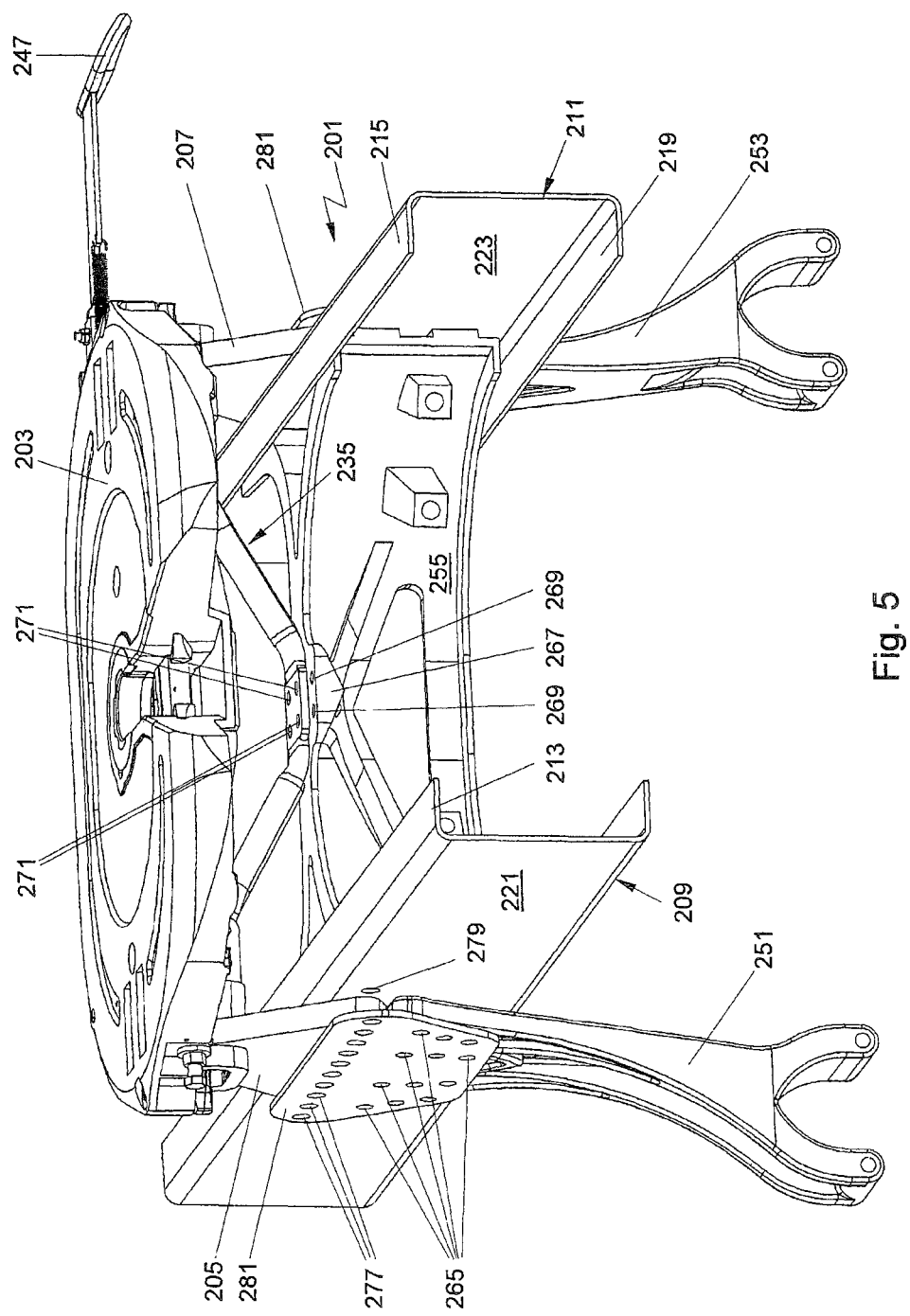
FIG. 5 is an isometric rear view similar to FIG. 2, but showing a third embodiment of the invention.

In FIG. 5 a slightly modified mounting arrangement 201 for a coupling saddle 203 is shown. Again similar elements as in the previous described embodiments are referenced by numerals that differ a full "100" with those used in FIGS. 2-5 and a full "200" with those used in FIG. 1. In the embodiment of FIG. 5 a more shallow design of external left and right suspension brackets 251, 253 is used. Rather than having horizontal mounting flanges on the left and right bearing blocks 205, 207, both the bearing blocks 205, 207 and the external suspension brackets 251, 253 are mounted directly to the outer surfaces of the vertical web portion 221, 223 of the left and right frame side members 209, 211. As is shown for the left bearing block 205 in FIG. 5, this can be mounted in selective positions along the relevant frame side member 209 by means of longitudinal row of mounting holes 279 in the vertical web portion 221 of the left frame side member 209. These openings 279 do not only correspond to an appropriate number of mounting holes in the left bearing support 205, but may also be provided as mounting openings 277 in an optional reinforcing plate 281. A similar arrangement applies to the right bearing block 207. Furthermore, the optional reinforcing plate 281 also extends over the mounting region of the suspension bracket 251 and has a corresponding set of mounting openings 265 to connect the external suspension bracket 251 to the vertical web portion 221 of the left frame side member 211. Again a similar arrangement applies to the right external suspension bracket 253, but this is hidden from view by the right frame side member 211. The optional reinforcing plate 281 may be a necessary requirement to increase stability and strength, and when there is no or insufficient mechanical interface between the lower end of the bearing blocks 205, 207 and the upper ends of the respective suspension brackets 251, 253. Also the mounting area available for the suspension brackets 251, 253 on the relevant vertical web portion 221, 223 of the relevant frame side member 209, 211 may be determinative for the need of the optional reinforcement plate 281. At this point, it may be observed that the separation between the bearing blocks 205, 207 and the respective suspension bracket 251, 253 is not located at the same vertical level with the upper horizontal flanges 213, 215 as in the embodiment of FIGS. 2-4, but extends in partial overlap with the vertical web 221, 223 of the frame side member 209, 211. It will be readily understood by those skilled in the art, that the line of separation between the bearing blocks 105, 107 and the suspension bracket 151, 153 of the embodiment of FIGS. 2-4 can also be lowered to extend in front of the vertical web portions 121, 123. Such a variation may give the additional benefit of additionally attaching the bearing blocks 105, 107 to the vertical web portion 121, 123 as taught by the embodiment of FIG. 5. In all other respects the embodiment of FIG. 5 is very similar to that of FIGS. 2-4 and this is reflected in the chassis traverse 255 having a mounting platform 267 with a plurality of mounting holes 269 for cooperation with a plurality of mounting holes 271 in central portion of the diagonal cross brace 235. The coupling saddles 103, 203 as shown in FIGS. 2 and 5 also have unlocking handles 147, 247 to enable a coupled semi-trailer to be disconnected.

Accordingly the foregoing discloses a mounting arrangement (1; 101; 201) for mounting of a trailer coupling to a tractor vehicle with a chassis that has a pair of rearwardly extending opposite left and right frame side members (9, 11; 109, 111; 209, 211) that includes opposite left and right bearing blocks (5, 7; 105, 107; 205, 207). The opposite left and right bearing blocks (5, 7; 105, 107; 205, 207) each have a support surface and a pivot bearing for being fixed directly or indirectly to the chassis of the tractor vehicle. A coupling saddle plate (3; 103; 203) is pivotally mounted from the opposite pivot bearings of the left and right bearing blocks (5, 7; 105, 107; 205, 207), while a diagonal cross brace (35; 135; 235) is provided between at least one of the left and right bearing blocks and a respective one of the transversely opposite right or left frame side members (9, 11; 109, 111; 209, 211). The diagonal cross brace (35; 135; 235) comprises at least one diagonally extending leg (39, 41; 139, 141) that is adapted to extend laterally inwardly and diagonally downward from at least one of the left and right bearing blocks (5, 7; 105, 107; 205, 207).

It is thus believed that the operation and construction of the present invention will be apparent from the foregoing description. The invention is not limited to any embodiment herein described and, within the purview of the skilled person; modifications are possible which should be considered within the scope of the appended claims. Equally all kinematic inversions are considered inherently disclosed and to be within the scope of the present invention. In the claims, any reference signs shall not be construed as limiting the claim. The term 'comprising' when used in this description or the appended claims should not be construed in an exclusive or exhaustive sense but rather in an inclusive sense. Thus the expression 'comprising' as used herein does not exclude the presence of other elements or steps in addition to those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Features which are not specifically or explicitly described or claimed may be additionally included in the structure according to the present invention without deviating from its scope.

The invention claimed is:

1. Method of mounting a trailer coupling, including the steps of:
    providing a tractor vehicle having a chassis with a pair of rearwardly extending opposite left and right frame side members;
    providing left and right bearing blocks, each having a support surface and a pivot bearing;
    fixing each of the left and right bearing blocks to the chassis of the tractor vehicle;
    providing a coupling saddle plate and pivotally mounting the coupling saddle plate from the opposite pivot bearings of the left and right bearing blocks;
    providing a diagonal cross brace between at least one of the left and right bearing blocks and a respective one of the transversely opposite right or left frame side members;
    providing the diagonal cross brace with a first diagonal leg, extending laterally inwardly and diagonally downward from the left bearing block and with a second diagonal leg, extending laterally inwardly and diagonally downward from the right bearing block; and
    providing a chassis traverse between the opposite left and right frame side member, and joining inward ends of the first and second diagonal legs to the chassis traverse.

2. Method according to claim 1, wherein the step of joining the inward ends of the first and second diagonal legs to the chassis traverse includes affixing to a top surface of the chassis traverse.

3. Method according to claim 1, wherein the step of mounting the left and right bearing blocks to the chassis, includes mounting to a respective one of the left and right frame side members.

4. Method according to claim 3, wherein the step of mounting the left and right bearing blocks to the respective one of the left and right frame side members of the chassis, includes mounting to an auxiliary component externally affixed to a respective one of the left and right frame side members.

5. Method according to claim 4, wherein the auxiliary component includes a respective left and right suspension bracket.

6. Method according to claim 5, including the further steps of providing each of the left and right suspension brackets with a substantially horizontally extending top surface and each of the left and right bearing blocks with the support surface extending substantially horizontally.

7. Method according to claim 3, wherein the step of mounting the left and right bearing blocks to the respective one of the left and right frame side members of the chassis, includes providing each of the left and right bear blocks with the support surface extending substantially vertically and mounting same to a confronting vertical web portion of the respective adjacent left and right frame side member.

8. Tractor vehicle for towing semi-trailers, including:
    a chassis with a pair of rearwardly extending opposite left and right frame side members;
    left and right bearing blocks, each having a support surface and a pivot bearing;
    each of the left and right bearing blocks being fixed to the chassis;
    a coupling saddle plate pivotally mounted from the opposite pivot bearings of the left and right bearing blocks; and
    a diagonal cross brace extending between at least one of the left and right bearing blocks and a respective one of the transversely opposite right or left frame side members,
    wherein the left and right bearing blocks are each mounted to the chassis, to project above an upper horizontal flange of the respective one of the left and right frame side members, and wherein the first and second diagonal legs each extend from their bearing block with an inward end to adjacent a lower horizontal flange of the respective opposite one of the right and left frame side members.

9. Tractor vehicle according to claim 8, wherein the left and right bearing blocks are each mounted to the chassis, to a respective one of the left and right frame side members thereof.

10. Tractor vehicle according to claim 8, wherein the diagonal cross brace further includes a first diagonal leg, extending laterally inwardly and diagonally downward from the left bearing block and wherein a second diagonal leg, extending laterally inwardly and diagonally downward from the right bearing block.

11. Tractor vehicle for towing semi-trailers, including:
    a chassis with a pair of rearwardly extending opposite left and right frame side members;
    left and right bearing blocks, each having a support surface and a pivot bearing;
    each of the left and right bearing blocks being fixed to the chassis;
    a coupling saddle plate pivotally mounted from the opposite pivot bearings of the left and right bearing blocks; and
    a diagonal cross brace extending between at least one of the left and right bearing blocks and a respective one of the transversely opposite right or left frame side members,
    wherein the diagonal cross brace further includes a first diagonal leg, extending laterally inwardly and diagonally downward from the left bearing block and wherein a second diagonal leg, extending laterally inwardly and diagonally downward from the right bearing block,
    the tractor vehicle further including a chassis traverse between the opposite left and right frame side member, wherein inward ends of the first and second diagonal legs are joined to the chassis traverse.

12. Tractor vehicle according to claim 11, wherein the inward ends of the first and second diagonal legs are joined to the chassis traverse by being affixing to a top surface of the chassis traverse.

13. Tractor vehicle according to claim 12, wherein the first and second diagonal legs are continued in the chassis traverse as reinforcements that each extend to adjacent a lower horizontal flange of the respective opposite right and left frame side members.

14. Tractor vehicle according to claim 13, wherein the diagonal reinforcements of the chassis traverse each have a lower end associated with a respective opposite anchorage point of an axle suspension reaction linkage.

15. Tractor vehicle according to claim 8, wherein the left and right bearing blocks are mounted to the respective one of the left and right frame side members of the chassis, by means of an auxiliary component that is externally affixed to a respective one of the left and right frame side members.

16. Tractor vehicle according to claim 15, wherein the auxiliary component includes a respective left and right suspension bracket.

17. Tractor vehicle according to claim 16, wherein each of the left and right suspension brackets has a substantially horizontally extending top surface and each of the left and right bearing blocks has its support surface extending substantially horizontally.

18. Tractor vehicle according to claim 8, wherein the left and right bearing blocks are mounted to the respective one of the left and right frame side members of the chassis, by means of the left and right bearing blocks each having its support surface extending substantially vertically and being mounted to a confronting vertical web portion of the respective adjacent left and right frame side member.

19. Tractor vehicle according to claim 18, wherein a reinforcing plate extends over a mounting region of each suspension bracket and each bearing block to further increase stability and strength.

20. Kit of parts for mounting a trailer coupling to a tractor vehicle having a chassis, the kit including:
- left and right bearing blocks, each having a support surface and a pivot bearing and adapted fixing directly to a chassis of a tractor vehicle;
- a coupling saddle plate for being pivotally mounting from the opposite pivot bearings of the left and right bearing blocks; and
- a diagonal cross brace comprising a diagonal leg adapted to extend from at least one of the left and right bearing blocks laterally inwardly and diagonally downward therefrom,
- wherein the diagonal cross brace includes first and second diagonal legs wherein inward ends of the first and second diagonal legs are adapted to be joined to a chassis traverse.

21. Kit of parts according to claim 20, wherein the inward ends of the first and second diagonal legs are joined to one another through a flattened centre section that is adapted to be joined to a chassis traverse.

22. Kit of parts according to claim 21, wherein the inwardly and downwardly extending legs of the diagonal cross brace are formed from hollow tubular material, which is flattened and bend in the middle.

23. Kit of parts according to claim 20, wherein the inward ends of the first and second diagonal legs of the diagonal cross brace are adapted to be affixed to a horizontal top surface of a chassis traverse.

24. Kit of parts according to claim 20, wherein the support surface of each of the left and right bearing blocks extends substantially horizontally.

25. Kit of parts according to claim 20, wherein the support surface of each of the left and right bearing blocks extends substantially vertically.

* * * * *